United States Patent
Bookstaff

(10) Patent No.: US 8,495,047 B2
(45) Date of Patent: Jul. 23, 2013

(54) METHOD AND SYSTEM FOR AUTOMATED INTELLIGENT ELECTRONIC ADVERTISING

(76) Inventor: Blake Bookstaff, Knoxville, TN (US)

(*) Notice: Subject to any disclaimer, the term of this patent is extended or adjusted under 35 U.S.C. 154(b) by 183 days.

(21) Appl. No.: 12/781,465

(22) Filed: May 17, 2010

(65) Prior Publication Data

US 2010/0268597 A1    Oct. 21, 2010

Related U.S. Application Data

(63) Continuation-in-part of application No. 11/170,263, filed on Jun. 29, 2005, now Pat. No. 7,720,828.

(60) Provisional application No. 60/583,960, filed on Jun. 29, 2004.

(51) Int. Cl.
    *G06F 17/30* (2006.01)

(52) U.S. Cl.
    USPC ........... 707/705; 707/706; 707/755; 707/769; 707/802; 709/203

(58) Field of Classification Search
    USPC .................... 707/705, 706, 755, 769, 802
    See application file for complete search history.

(56) References Cited

U.S. PATENT DOCUMENTS

| | | |
|---|---|---|
| 3,928,724 A | 12/1975 | Byram et al. |
| 4,053,949 A | 10/1977 | Recca et al. |
| 4,071,698 A | 1/1978 | Barger, Jr. et al. |
| 4,232,199 A | 11/1980 | Boatwright et al. |
| 4,446,337 A | 5/1984 | Cofer |
| 4,451,704 A | 5/1984 | Winkelman |
| 4,608,460 A | 8/1986 | Carter et al. |
| 4,654,482 A | 3/1987 | DeAngelis |
| 4,791,666 A | 12/1988 | Cobb et al. |
| 4,850,007 A | 7/1989 | Marino et al. |
| 4,897,866 A | 1/1990 | Majmudar et al. |
| 4,918,719 A | 4/1990 | Daudelin |
| 4,943,995 A | 7/1990 | Daudelin et al. |
| 4,959,855 A | 9/1990 | Daudelin |
| 4,975,941 A | 12/1990 | Morganstein et al. |
| 4,979,206 A | 12/1990 | Padden et al. |

(Continued)

FOREIGN PATENT DOCUMENTS

| | | |
|---|---|---|
| EP | 1 662 366 A1 | 5/2006 |
| WO | WO 00/38399 A | 6/2000 |

(Continued)

OTHER PUBLICATIONS

Partial European Search Report EP 08 01 8481 Dated: Nov. 28, 2008.

(Continued)

*Primary Examiner* — Paul Kim
(74) *Attorney, Agent, or Firm* — Lesavich High-Tech Law Group, P.C.; Stephen Lesavich

(57) ABSTRACT

A method and system for automated intelligent electronic advertising. The method and system parse electronic information messages (e.g., e-mail, IM, SMS, MMS, social networking messages, etc.) using information theory for keywords and make search engine queries or database queries for electronic links based on the identified keywords. Hierarchical electronic links are added to the electronic information messages creating a modified electronic information message. This allows additional electronic information to be accessed from the modified electronic information message based on information content of the original electronic information message via pre-determined hierarchy.

21 Claims, 10 Drawing Sheets

U.S. PATENT DOCUMENTS

| | | | |
|---|---|---|---|
| 5,131,024 | A | 7/1992 | Pugh et al. |
| 5,377,354 | A | 12/1994 | Scannell |
| 5,425,097 | A | 6/1995 | Pula |
| 5,448,625 | A | 9/1995 | Lederman |
| 5,473,671 | A | 12/1995 | Partridge, III |
| 5,475,746 | A | 12/1995 | Miller et al. |
| 5,485,511 | A | 1/1996 | Iglehart et al. |
| 5,515,098 | A | 5/1996 | Carles |
| 5,544,236 | A | 8/1996 | Andruska et al. |
| 5,619,562 | A | 4/1997 | Maurer et al. |
| 5,642,407 | A | 6/1997 | He |
| 5,652,784 | A | 7/1997 | Blen et al. |
| 5,661,788 | A | 8/1997 | Chin |
| 5,701,419 | A | 12/1997 | McConnell |
| 5,734,710 | A | 3/1998 | Hirth et al. |
| 5,751,802 | A | 5/1998 | Carr et al. |
| 5,757,899 | A | 5/1998 | Boulware et al. |
| 5,802,149 | A | 9/1998 | Hanson |
| 5,825,862 | A | 10/1998 | Voit et al. |
| 5,835,570 | A | 11/1998 | Wattenbarger |
| 5,852,775 | A | 12/1998 | Hidary |
| 5,873,032 | A | 2/1999 | Cox et al. |
| 5,875,231 | A | 2/1999 | Farfan et al. |
| 5,878,338 | A | 3/1999 | Alperovich et al. |
| 5,880,770 | A | 3/1999 | Ilcisin et al. |
| 5,892,820 | A | 4/1999 | Armstrong |
| 5,943,410 | A | 8/1999 | Shaffer et al. |
| 5,966,437 | A | 10/1999 | Cox et al. |
| 5,983,544 | A | 11/1999 | Fagan |
| 6,031,904 | A | 2/2000 | An et al. |
| 6,035,190 | A | 3/2000 | Cox et al. |
| 6,038,307 | A | 3/2000 | Fahrer et al. |
| 6,061,439 | A | 5/2000 | Bleile et al. |
| 6,084,628 | A | 7/2000 | Sawyer |
| 6,104,786 | A | 8/2000 | Gibilisco et al. |
| 6,118,860 | A | 9/2000 | Hillson et al. |
| 6,178,446 | B1 | 1/2001 | Gerszberg et al. |
| 6,188,751 | B1 | 2/2001 | Scherer |
| 6,198,812 | B1 | 3/2001 | Weber |
| 6,205,215 | B1 | 3/2001 | Dombakly |
| 6,256,515 | B1 | 7/2001 | Cox et al. |
| 6,301,338 | B1 | 10/2001 | Makela |
| 6,301,342 | B1 | 10/2001 | Ander et al. |
| 6,310,948 | B1 | 10/2001 | Nemeth |
| 6,324,273 | B1 | 11/2001 | Alcott |
| 6,327,343 | B1 | 12/2001 | Epstein et al. |
| 6,327,344 | B1 | 12/2001 | Paxson |
| 6,347,225 | B1 | 2/2002 | Nishiyama |
| 6,353,852 | B1 | 3/2002 | Nestoriak, III et al. |
| 6,381,320 | B1 | 4/2002 | Creamer et al. |
| 6,400,804 | B1 | 6/2002 | Bilder |
| 6,456,709 | B1 | 9/2002 | Cox et al. |
| 6,473,612 | B1 | 10/2002 | Cox et al. |
| 6,504,912 | B1 | 1/2003 | Glossbrenner |
| 6,516,311 | B1 | 2/2003 | Yacoby |
| 6,587,138 | B1 | 7/2003 | Vogt et al. |
| 6,587,549 | B1 | 7/2003 | Weik |
| 6,590,970 | B1 | 7/2003 | Cai et al. |
| 6,597,769 | B2 | 7/2003 | Snow |
| 6,614,896 | B1 | 9/2003 | Rao |
| 6,618,474 | B1 | 9/2003 | Reese |
| 6,633,850 | B1 | 10/2003 | Gabbard |
| 6,668,281 | B1 | 12/2003 | Ayyadurai |
| 6,718,551 | B1 | 4/2004 | Swix et al. |
| 6,856,673 | B1 | 2/2005 | Banks et al. |
| 6,965,919 | B1 | 11/2005 | Woods et al. |
| 6,977,997 | B2 | 12/2005 | Shioda et al. |
| 7,013,323 | B1 | 3/2006 | Thomas |
| 7,100,199 | B2 | 8/2006 | Ginter |
| 7,187,761 | B2 | 3/2007 | Bookstaff |
| 7,227,936 | B2 | 6/2007 | Bookstaff |
| 7,376,642 | B2 * | 5/2008 | Nayak et al. .......... 1/1 |
| 7,573,993 | B2 | 8/2009 | Bookstaff |
| 7,720,828 | B2 | 5/2010 | Bookstaff |
| 8,078,977 | B2 | 12/2011 | Bookstaff |
| 8,130,928 | B2 | 3/2012 | Bookstaff |
| 8,131,585 | B2 * | 3/2012 | Nicholas et al. .......... 705/14.26 |
| 8,254,547 | B2 | 8/2012 | Bookstaff |
| 8,254,548 | B2 | 8/2012 | Bookstaff |
| 8,254,549 | B2 | 8/2012 | Bookstaff |
| 8,363,806 | B2 | 1/2013 | Bookstaff |
| 2001/0012344 | A1 | 8/2001 | Kwon |
| 2002/0044639 | A1 | 4/2002 | Shioda et al. |
| 2002/0049968 | A1 | 4/2002 | Wilson et al. |
| 2002/0051521 | A1 | 5/2002 | Patrick |
| 2002/0091566 | A1 | 7/2002 | Siegel |
| 2002/0107730 | A1 | 8/2002 | Bernstein |
| 2002/0193095 | A1 | 12/2002 | Hutcheson et al. |
| 2002/0194061 | A1 | 12/2002 | Himmel et al. |
| 2003/0007620 | A1 | 1/2003 | Elsey et al. |
| 2003/0033198 | A1 | 2/2003 | Flannery et al. |
| 2003/0041126 | A1 | 2/2003 | Buford |
| 2003/0050837 | A1 | 3/2003 | Kim |
| 2003/0063721 | A1 | 4/2003 | Hirose |
| 2003/0161464 | A1 | 8/2003 | Rodriguez et al. |
| 2003/0177063 | A1 | 9/2003 | Currans et al. |
| 2003/0212710 | A1 | 11/2003 | Guy |
| 2003/0223563 | A1 | 12/2003 | Wolmuth |
| 2003/0231754 | A1 | 12/2003 | Stein et al. |
| 2004/0023644 | A1 | 2/2004 | Montemer |
| 2004/0039786 | A1 | 2/2004 | Horvitz et al. |
| 2004/0107125 | A1 | 6/2004 | Guheen et al. |
| 2005/0096979 | A1 * | 5/2005 | Koningstein .......... 705/14 |
| 2005/0136949 | A1 * | 6/2005 | Barnes, Jr. .......... 455/461 |
| 2005/0182673 | A1 | 8/2005 | Marzian et al. |
| 2005/0216457 | A1 | 9/2005 | Walther |
| 2005/0228860 | A1 * | 10/2005 | Hamynen et al. .......... 709/203 |
| 2005/0289113 | A1 | 12/2005 | Bookstaff |
| 2006/0161524 | A1 | 7/2006 | Roy |
| 2007/0106654 | A1 | 5/2007 | Bookstaff |
| 2007/0130030 | A1 | 6/2007 | Bookstaff |
| 2007/0253544 | A1 | 11/2007 | Bookstaff |
| 2009/0168987 | A1 | 7/2009 | Bookstaff |
| 2009/0175431 | A1 | 7/2009 | Bookstaff |
| 2009/0175433 | A1 | 7/2009 | Bookstaff |
| 2009/0182622 | A1 * | 7/2009 | Agarwal et al. .......... 705/10 |
| 2010/0268597 | A1 | 10/2010 | Bookstaff |
| 2011/0208710 | A1 | 8/2011 | Lesavich |
| 2012/0084665 | A1 | 4/2012 | Bookstaff |
| 2012/0185307 | A1 | 7/2012 | Bookstaff |
| 2012/0278622 | A1 | 11/2012 | Lesavich et al. |
| 2013/0034217 | A1 | 2/2013 | Bookstaff et al. |
| 2013/0034224 | A1 | 2/2013 | Bookstaff et al. |
| 2013/0034225 | A1 | 2/2013 | Bookstaff et al. |

FOREIGN PATENT DOCUMENTS

| | | |
|---|---|---|
| WO | WO 01/47264 A | 6/2001 |
| WO | WO 2004/029759 | 4/2004 |
| WO | WO 2004/042525 | 5/2004 |
| WO | WO 2007/024868 A2 | 3/2007 |

OTHER PUBLICATIONS

Partial PCT Search Report PCT/US2007/024,995, Apr. 10, 2008.
Partial Canadian Patent Office Search Report 2,569,529.
"Yahoo Block" Internet Citation, [Online] (Jun. 18, 2005), XP-002413362.
Partial PCT Search Report PCT/US2005/023,495.
http://gmail.google.com, Jun. 16, 2004, retrieved on Feb. 14, 2007 at http://archive.org/web/web.php by Canadian Patent Office.
Partial PCT Search Report PCT/US2003/035,617.
Webwasher Com AG (Mar. 28, 2000), XP-002156461: Siemens-Backed WebWasher Empowers Companies to Remove Unwanted Web Content and Ensure Privacy Protection, Internet Citation, URL:http//www.seomoz.org/blogdetail.php?I,2pages.
Internet:URL:http://www.seomoz.ort/blogdetail.php?ID=206> [retrieved on Jan. 3, 2007] the whole document.

\* cited by examiner

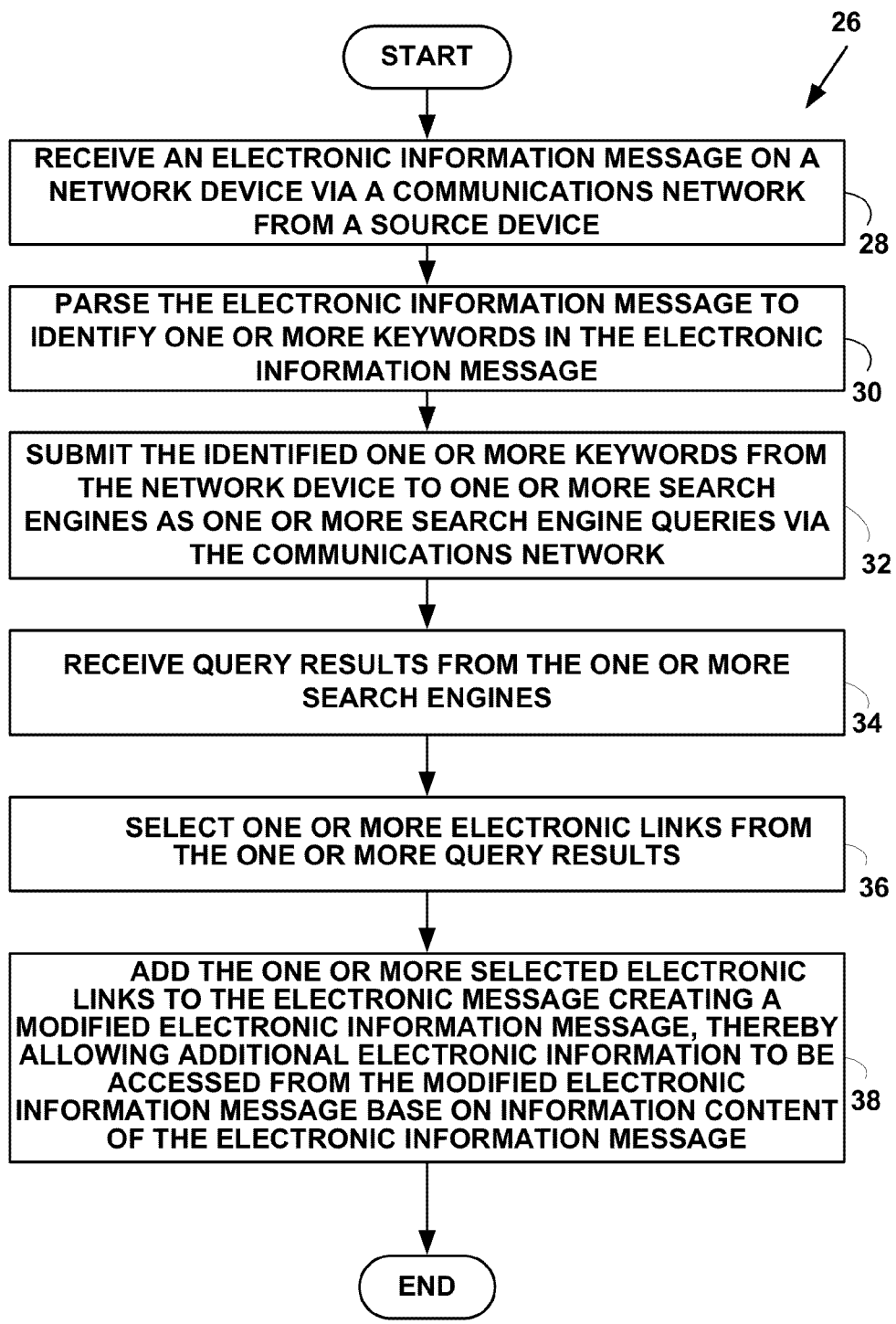

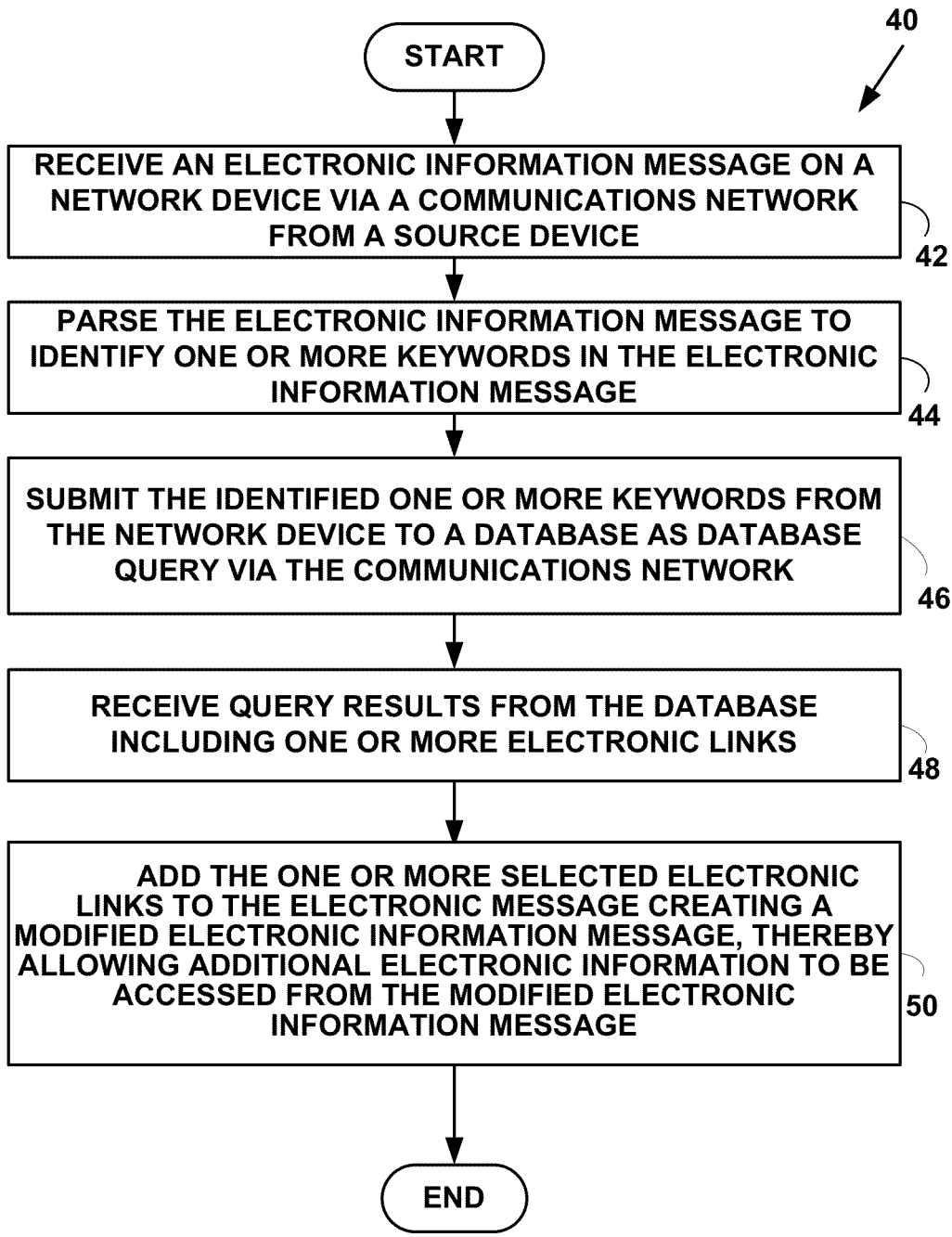

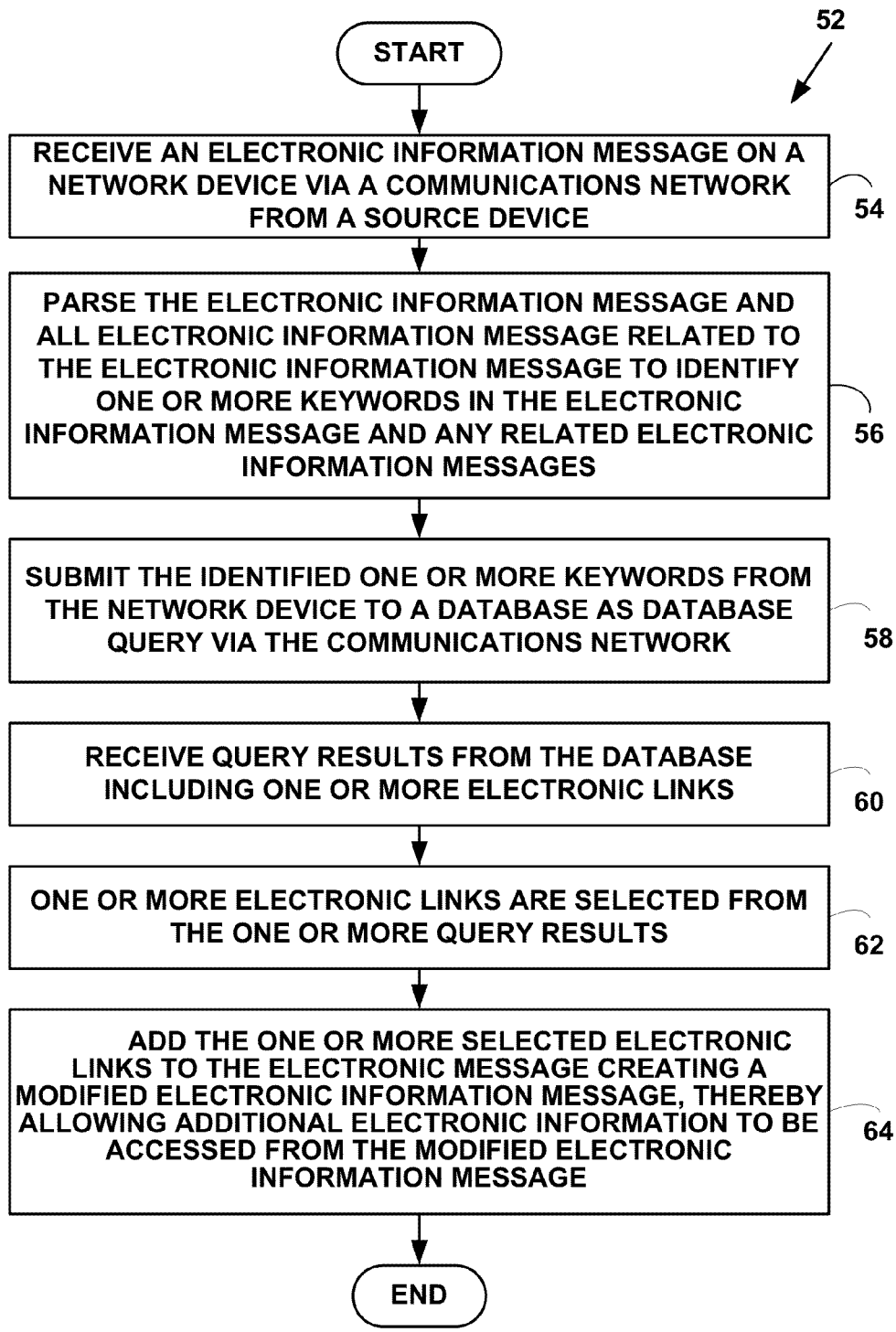

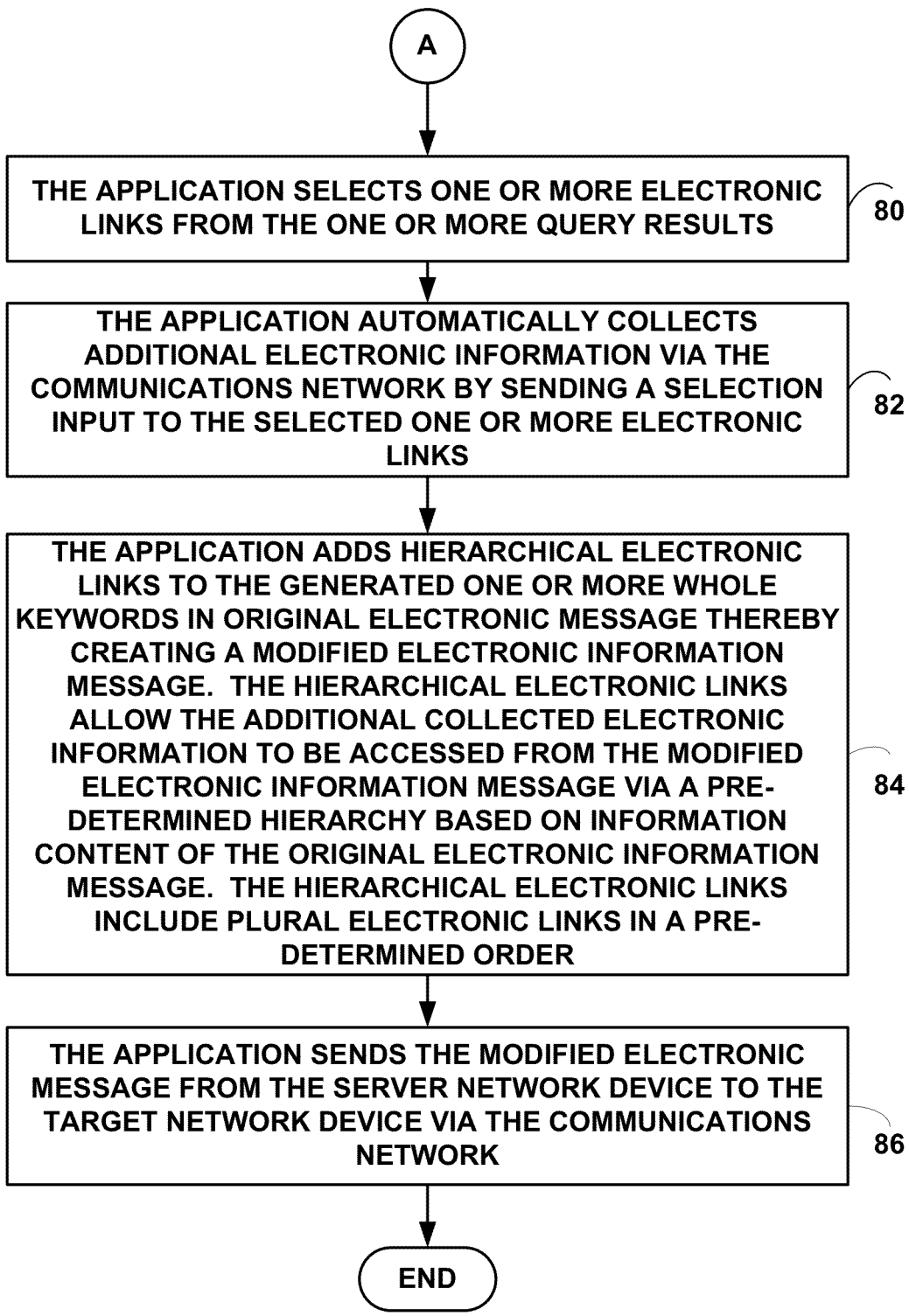

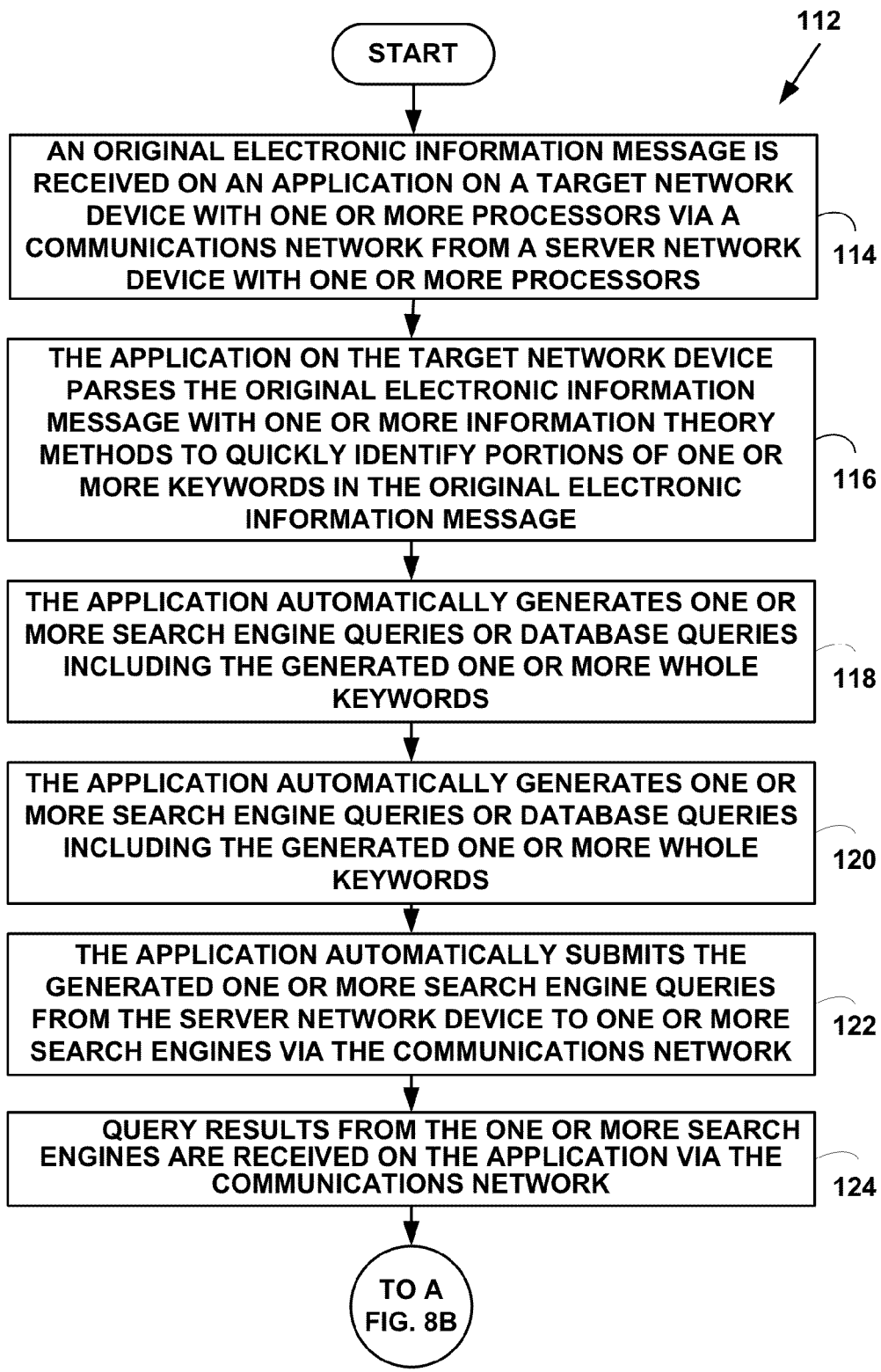

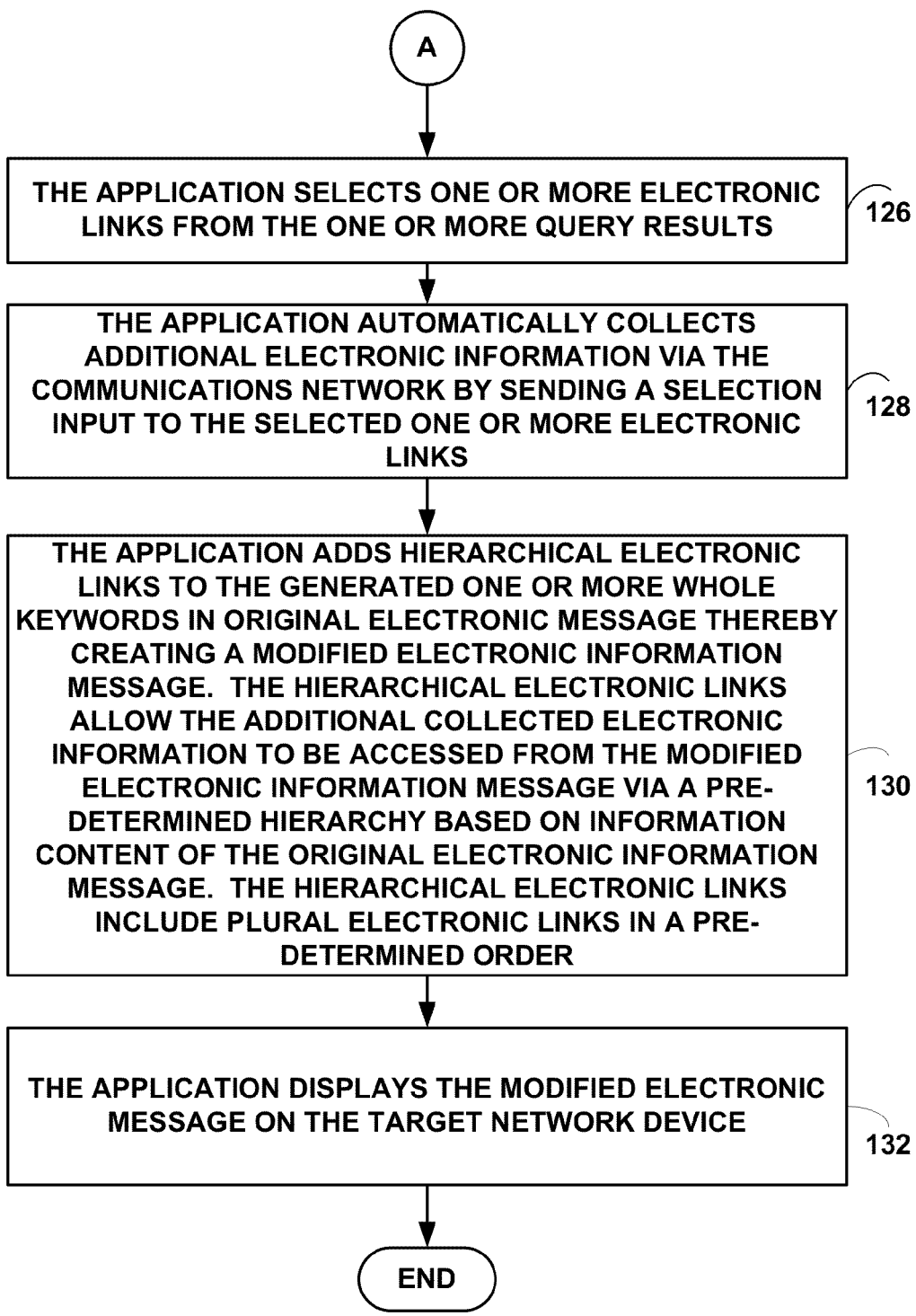

METHOD AND SYSTEM FOR AUTOMATED INTELLIGENT ELECTRONIC ADVERTISING

CROSS-REFERENCE TO RELATED APPLICATIONS

This application is a Continuation-In-Part (CIP) of U.S. patent application Ser. No. 11/170,263, filed Jun. 29, 2005, that issued as U.S. Pat. No. 7,720,828, on May 18, 2010, that claims priority to U.S. Provisional Patent application 60/583,960, filed Jun. 29, 2004, the contents of all of which are incorporation by reference.

FIELD OF INVENTION

This application relates to automatic processing of electronic information. More specifically, it relates to a method and system for automatic electronic advertising.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

Commercial web-sites offer many different types of electronic advertisements. The advertisements typically include electronic links to advertiser's web-sites. There are many problems associated with designing, implementing and deploying advertising on a web-site.

Another problem is that many types of online advertising are considered spam. Another problem is that pop-up advertising is being block by operating systems such as Windows XP and add-on software. This pop-up blocking is becoming a standard feature in many operating systems. Another problem is that banner ads and pay-per-click ads are no longer an effective means of advertising online.

Electronic mail (e-mail) is one of the most common types of electronic information sent and received. E-mail is sent and received over public networks such as the Internet, and many private networks such as intranets, local area networks (LAN), etc.

Advertisers and other information providers are always looking for new ways to use existing technologies such as e-mail for advertising. There are many free e-mail services that routinely add advertising to user's e-mail as a condition of providing free e-mail. However, there is no easy way to add advertising to e-mail. In addition, general e-mail advertising is often considered spam.

One attempt to solve these problems is "Gmail" provided by Google. Gmail includes a web-interface that displays e-mail. Electronic advertising is displayed on the web-interface that corresponds in part to content of the e-mail.

This it is desirable to use e-mail and other types of electronic information messages for providing advertising and other types of electronic information.

SUMMARY OF THE INVENTION

In accordance with preferred embodiments of the invention, some of the problems associated with electronic advertising are overcome. A method and system for intelligent electronic advertising is presented.

The method and system parse electronic information messages (e.g., e-mail, IM, SMS, MMS, social networking messages, etc.) using information theory for keywords and make search engine queries or database queries for electronic links based on the identified keywords. Hierarchical electronic links are added to the electronic information messages creating a modified electronic information message. This allows additional electronic information to be accessed from the modified electronic information message based on information content of the original electronic information message via pre-determined hierarchy.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for automated electronic information message processing;

FIG. 3 is a flow diagram illustrating a method for automated electronic information message processing;

FIG. 4 is a flow diagram illustrating a method for automatic electronic information message processing;

FIGS. 5A and 5B are a flow diagram illustrating a method for automatic electronic information message processing;

FIGS. 8A and 8B are a flow diagram illustrating a method for automatic electronic information message processing.

DETAILED DESCRIPTION OF THE INVENTION

Exemplary Electronic Information Message Processing System

Figure 1:
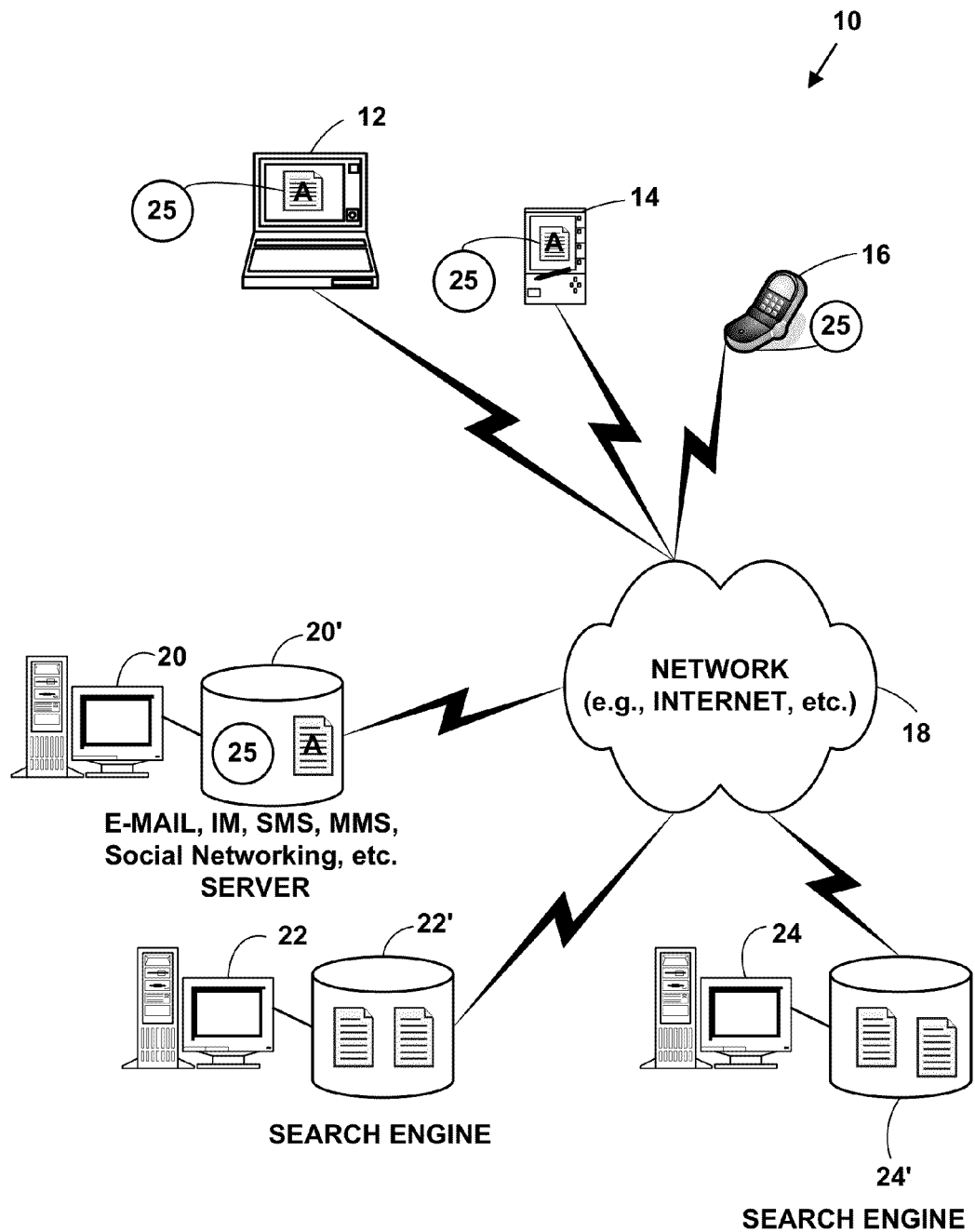
FIG. 1 is a block diagram illustrating an exemplary electronic information message processing system.

FIG. 1 is a block diagram illustrating an exemplary electronic information message processing system 10. The exemplary electronic information message processing system 10 includes, but is not limited to, one or more target devices 12, 14, 16 (only three of which are illustrated). The target devices 12, 14, 16 include, but are not limited to, non-mobile computers, wireless devices, laptop computers, mobile phones, personal information devices, personal digital/data assistants (PDA), hand-held devices, network appliances, Internet appliances, two-way pagers, etc. However, the present invention is not limited to these target electronic devices and more, fewer or others types of target electronic devices can also be used. The target devices 12, 14, 16 function as client devices in some instances and server devices in other instances.

The target devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications with wired or wireless communication protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, etc.).

Preferred embodiments of the present invention include devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wap-forum.org." ADSL Forum documents can be found at the URL "www.adsl.com."

In one embodiment of the present invention, the wireless interfaces used for the plural target network devices 12, 14, 16 include but are not limited to, a paging and wireless messaging network, a cellular telephone network, a Packet Cellular Network ("PCN") or Global System for Mobile Communications, ("GSM"), Generic Packet Radio Services ("GPRS"), or network/Personal Communications Services network ("PCS"), a Cellular Digital Packet Data ("CDPD"), Wireless Application Protocol ("WAP") or Digital Audio Broadcasting ("DAB") network or other types of wireless networks.

The wireless networks include, but are not limited to Code Division Multiple Access ("CDMA"), Time Division Multiple Access ("TDMA"), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is currently not widely used in the United States, but its use is growing. GSM is a wireless platform based on TDMA to digitize data. GSM includes not only telephony and Short Message Services ("SMS") but also voice mail, call forwarding, fax, caller ID, Internet access, and e-mail. As is known in the art, SMS is type of communications service that enables a user to allow private message communications with another user.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

In one embodiment of the present invention, the wireless interfaces used for the plural target network devices 12, 14, 16 include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

The target devices 12, 14, 16 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP), Simple Mail Transfer Protocol (SMTP), Post Office Protocol version 3 (POP3), Internet Mail Access Protocol (IMAP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

The GPS (Global Positioning System) is a "constellation" of more than twenty satellites that orbit the Earth and make it possible for people with ground receivers to pinpoint their geographic location. The location accuracy is anywhere from 100 to 10 meters for most equipment. Accuracy can be pin-pointed to within one (1) meter with special military-approved equipment. GPS equipment is widely used in science and has now become sufficiently low-cost so that almost anyone can own a GPS receiver.

The GPS satellite system is owned and operated by the U.S. Department of Defense but is available for general use around the and includes: (1) twenty-one or more GPS satellites and three spare satellites are in geo-stationary orbit at 10,600 miles above the Earth. The satellites are spaced so that from any point on Earth, four satellites will be above the horizon; (2) Each satellite includes a processors, an atomic clock, and a wireless communications system. With an understanding of its own orbit and the clock, a GPS satellite continually broadcasts its changing position and time. (Once a day, each satellite checks its own sense of time and position with a ground station and makes any minor correction.); (3) On the ground, any GPS receiver "triangulates" its own position by getting bearings from three of the four satellites. The result is provided in the form of a geographic position—longitude and latitude—to, for most receivers, within 100 meters; (4) If the receiver is also equipped with a display screen that shows a map, the GPS-determined position can be shown on the map; (4) If a fourth satellite can also be received on the GPS device, the device can calculate the altitude as well as the geographic position; (5) If the GPS device is moving, the GPS receiver is also be able to calculate a speed and direction of travel and give estimated times of arrival to specified destinations.

National Marine Electronics Association (NMEA) is a standard protocol, used by GPS receivers to receive and transmit data to and from GPS satellites or GPS satellite gateways. NMEA output is EIA-422A. However, the present invention is not limited to NMEA protocols and other GPS protocols can also be used to practice the invention.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

An operating environment for the devices of the electronic information processing system 10 include a processing system with one or more high speed Central Processing Unit(s) ("CPU"), one or more processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information, and the maintenance of data bits at memory locations in a memory system to thereby reconfigure or otherwise alter the CPU's or processor's operation, as well as other processing of electronic information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU or processors. The computer readable medium may cooperating or interconnected computer readable mediums, which exist exclusively on the processing system or can be distributed among multiple interconnected processing systems that may be local or remote to the processing system.

Automatic Electronic Information Message Processing with Search Engine Queries

FIG. 2 is a flow diagram illustrating a Method 26 for automated electronic information message processing. At Step 28, an electronic information message is received on a network device via a communications network from a source device. At Step 30, the electronic information message is parsed to identify one or more keywords in the electronic information message. At Step 32, the identified one or more keywords are submitted from the network device to one or more search engines as one or more search engine queries via the communications network. At Step 34, query results are received from the one or more search engines. At Step 36, one or more electronic links are selected from the one or more query results. At Step 38, the one or more selected electronic links are added to the electronic message creating a modified electronic information message, thereby allowing additional electronic information to be accessed from the modified electronic information message based on the original content of the electronic information message.

In another embodiment, Method 26 may further include an additional Step 39 for sending the modified electronic information message from the network device to a destination device. However, present invention is not limited to such an embodiment Method 26 can be used without this additional Step 40.

Method 26 is illustrated with an exemplary embodiment. However, the present invention is not limited to such an exemplary embodiment and other embodiment can be used to practice the invention.

In such an exemplary embodiment at Step 28, an e-mail message is received on an e-mail server 20 via a communications network 18 from a source device 12. The source device 12 is sending the e-mail to a destination device 14. The e-mail server 20 includes, but is not limited to, an e-mail server using SMTP, POP3, IMAP or other protocols. In another embodiment, an instant message is received and processed. However, the present invention is not limited to these protocols and other protocols can also be used to practice the invention.

At Step 30, the e-mail message is parsed to identify one or more keywords in the e-mail message. In one embodiment, the one or more keywords include advertising keywords stored in a database 20'. In another embodiment, the one or more keywords include keywords dynamically generated using information theory to decide relevant keywords (e.g., automatically eliminate words such as the, and, to, etc.) However, the present invention is not limited to such embodiments and other embodiments can also be used to practice the invention. The e-mail message can parsed to identify keywords for virtually any purpose.

At Step 32, the identified one or more keywords are submitted from the e-mail server 20 to one or more search engines 22, 24 as one or more search engine queries via the communications network 18. For example, the one or more identified keywords may be submitted to public search engines such as Google, Lycos, Yahoo, Galaxy, etc. on the Internet. The one or more identified keywords may also be submitted to one or more private search engines on an intranet or other private or public networks. The one or more identified keywords may also be submitted to one or more private search engines cached directly in memory on a network device that are used without accessing communications network 18.

On advantage of using search engine queries is that electronic links obtained should always be up to date as search engines spend a lot of time and resources making sure the electronic links are accurate and not broken.

The one or more identified keywords may include advertising keywords. For example, the advertising keywords may include those related to travel, such as hotel, ticket, airport, arrive, depart, etc. In one embodiment, the one or more identified keywords may be used directly for the search engine queries (e.g., hotel). In another embodiment, the one or more identified keywords may be mapped to one or more other sets of related keywords that are used to make the search engine queries (e.g., travel→hotel, airplane ticket, rental car, etc.). In another embodiment, two or more identified keywords may be mapped to a single keyword (e.g., hotel, airplane ticket, car rental→travel).

In another embodiment, the one or more identified keywords may include non-advertising keywords, such as public interest, public service or general information keywords (e.g., school information, community events, public safety, etc.). However, the present invention is not limited to these embodiments and other embodiments may be used to practice the invention.

At Step 34, query results are received from the one or more search engines 22, 24. The query results typically include a list of electronic links related to the identified keyword used to generate the search engine query. The list of electronic links include Hyper Text Markup Language (HTML), eXtensible Markup Language (XML) or other types of electronic links. The electronic links also typically include a URL (e.g., www.hotels.com) used to allow electronic linking to another web-site.

Table 1 illustrates a portion of an exemplary portion of a query search result from the Google search engine for the keyword "hotel."

TABLE 1 hotels.com - The best prices at the best places.Guaranteed.
Find the Lowest Hotel Rates Guaranteed! From Luxury Hotels to Budget Accommodations. Hotels.Com has the Best Deals and Discounts for Hotel Rooms Anywhere.
www.hotels.com/ - 89k - Jun. 19, 2005.

At Step 36, one or more electronic links are selected from the one or more query results. In one embodiment, the electronic links selected are selected from a top of list returned from a search engine query (e.g., one or more of the first five to ten entries returned). In another embodiment, the electronic links selected are selected by processing the query results and applying a pre-determined method to select electronic links from throughout the search query results based on pre-determined conditions (e.g. such as payment of advertising fees, etc.).

In another embodiment, one or more of electronic links selected are selected based on agreements with advertisers. For example, query results for the identified keyword "hotel" may return a list of electronic links to 1000 providers of hotel rooms. An advertiser may desire to have an electronic link to their web-site be used and given priority over those returned by the query results. However, the present invention is not limited to these embodiment and other embodiments can also be used to practice the invention.

At Step 38, the one or more selected electronic links are added to the electronic message creating a modified e-mail message, thereby allowing additional electronic information to be accessed from the modified e-mail message. The electronic links include electronic links for linking directly to another web-site (e.g., a hotel room booking web-site), a web-site including links to other web-sites, to initiate a static search engine query (e.g., a static URL for a search engine query), to initiate a dynamic search engine query and other types of electronic links.

For example, if an e-mail message included the identified keyword "hotel," one or more electronic links are added to the e-mail message to web-sites that provide information on booking hotel rooms.

Table 2 illustrates and exemplary e-mail message automatically processed with Method 26. The identified keywords include "Delta" and "hotel."

TABLE 2

Steve,
    Maybe we could go Delta but I am not sure. We definitely will need a hotel.
Blake In one embodiment, additional text and/or graphical information is automatically created and the electronic link is added to the e-mail message at a top, bottom or side of the e-mail message. In such an embodiment, the electronic link is added to the e-mail message in association with the identified keywords. The additional text and/or graphics may include banner advertisements, graphical advertisements and other types of advertisements that allow a user to select (e.g., click on) the advertisement and receive additional information via the electronic link. In another embodiment, all or a portion of text return from a search engine query is used along with the electronic link.

Table 3 illustrates an exemplary modified e-mail message modified at Step 38. The identified keywords include "Delta" and "hotel." The electronic link is added to the bottom of the original e-mail message to create a modified e-mail message. In one embodiment, the electronic link includes all text added to the modified e-mail message. In another the electronic link includes only a portion of text added to the modified e-mail message.

TABLE 3

Steve,
    Maybe we could go Delta but I am not sure. We definitely will need a hotel.
Blake Find the Lowest Hotel Rates Guaranteed! From Luxury Hotels to Budget Accommodations. Hotels.Com has the Best Deals and Discounts for Hotel Rooms Anywhere. www.hotels.com In one embodiment, Step 38 includes modifying one or more characteristics of the identified keyword to distinguish the identified keyword from other portions of the electronic information message. In another embodiment, Step 38 includes modifying a font color, a font size, a font bolding, a font underlining, or a font italicizing of a font used to enhance display of the identified keyword in the e-mail message.

For example, the identified keyword "hotel" appears as normal black and white text in the e-mail message. At Step 38, the identified keyword "hotel" is modified to include a different font color (e.g., blue) a different font bolding (e.g., bold) and a different font underlining (e.g., underlined). In this example, the identified keyword "hotel" becomes hotel. The modified keyword may include an electronic link to www.hotels.com.

Table 4 illustrates exemplary HTML code for the modified keyword hotel added to the e-mail message including bolding, underling and an electronic link to www.hotels.com However, the present invention is not limited to such HTML code and other types of electronic links can be used to practice the invention.

TABLE 4

<A href="http://www.hotels.com"><B><U>hotel</B></U></A>

The identified keyword "Delta" is processed and displayed in a similar manner to include an electronic link for www.delta.com, (i.e., the keyword Delta is illustrated as being bolded and underlined).

Table 5 illustrates and exemplary e-mail message modified at Step 38. The identified keywords include "Delta" and "hotel."

TABLE 5

Steve,
    Maybe we could go Delta but I am not sure. We definitely will need a hotel.
Blake Table 6 illustrates a combination of adding electronic links and modifying identified keywords. Various combinations thereof of adding electronic links and modifying electronic keywords can be used to practice invention.

TABLE 6

Steve,
    Maybe we could go Delta but I am not sure. We definitely will need a hotel.
Blake Find the Lowest Hotel Rates Guaranteed! From Luxury Hotels to Budget Accommodations. Hotels.Com has the Best Deals and Discounts for Hotel Rooms Anywhere. www.hotels.com.

In another embodiment, the same electronic link is added to repeating occurrences of an identified keyword. In another embodiment, different electronic links are added to repeating occurrences of the identified keywords. For example, if the word "hotel" appeared in the e-mail message twice, in the first embodiment, the same electronic link to the same web-site would be added to the e-mail message. In the second embodiment, a first electronic link to a first web-site is added to the first occurrence of the word "hotel" and a second different electronic link for a different hotel book web-site is added to the second occurrence of the word "hotel."

In another embodiment, Method 26 may further include an additional Step 39 for sending the modified e-mail message from the e-mail server 20 to a destination device 14.

In various embodiments, Method 26 is used to parse e-mail messages either at the e-mail server 20 or on a target device 12, 14, 16, or anywhere in the e-mail chain on the e-mail server 20 or in an e-mail box on the target device 12, 14, 16. Chains of IM messages can also be parsed.

If there were back and forth responses to the exemplary e-mail illustrated in Tables 2, 3, 5 and 6, Method 26 could be used to parse the whole e-mail chain. In one embodiment, the e-mail can be parsed anywhere in a communications path anywhere on any device the e-mail passes through on the communications network 18. For example, suppose a response to the exemplary e-mail include a discussion about rental cars and restaurants. These additional keywords would be identified and electronic links added to the e-mail chain in one or more places (e.g., source device 12, e-mail server 20, other servers on the communications network 18, gateways, routers, bridge, destination device 14, etc.) as well as the original identified keywords for "hotel" and "Delta." In addition, the parsing can include parsing e-mail message with a same or similar subject line, by a same sender, sent during a specified time period and based on a large number of other characteristics used to identify e-mails or e-mail senders.

In one embodiment computer software is added to an e-mail server 20 to practice Method 26. In another embodiment, computer software is added to a target device 12, 14, 16 to practice Method 26.

In one embodiment, when a user selects an electronic link in the modified electronic information message, additional electronic information is displayed within the electronic information message itself. In another embodiment, when the electronic link is selected, a new window or other viewing area is created to display the additional electronic information. However, the present invention is not limited to such an exemplary embodiment and other embodiment can be used to practice the invention.

Automatic Electronic Information Message Processing with Database Queries

FIG. 3 is a flow diagram illustrating a Method 40 for automated electronic information message processing. At Step 42, an electronic information message is received on a network device via a communications network from a source device. At Step 44, the electronic information message is parsed to identify one or more keywords in the electronic information message. At Step 46, the identified one or more keywords are submitted as a query to a database. The database includes electronic links for electronic information suppliers who entered into a pre-determined agreement to provide electronic links. At Step 48, a database query result is returned from the database including one or more electronic links. At Step 50, the one or electronic links are added to the electronic information message creating a modified electronic information message, thereby allowing additional electronic information to be accessed from the modified electronic information message.

Method 40 is illustrated with an exemplary embodiment. However, the present invention is not limited to such an exemplary embodiment and other embodiment can be used to practice the invention.

In such an exemplary embodiment At Step 42, an e-mail message is received on an e-mail server 20 via a communications network 18 from a source device 12. At Step 44, the e-mail message is parsed to identify one or more keywords in the e-mail message. In one embodiment, the keywords are parsed using a list of keywords stored in database 20'. However, the present invention is not limited to this embodiment and other embodiments can also be used to practice the invention (e.g., searching for keywords based on information theory, etc.).

At Step 46, the identified one or more keywords are submitted as a query to a database 20'. The database 20' includes one or more electronic links for electronic information suppliers who have pre-determined agreement to provide electronic links. For example, the database 20' includes electronic links to x-different travel ticket booking web-sites. The travel ticket booking web-sites have paid a fee to allow their electronic links to be provided and inserted into e-mail message that flow through the e-mail server 20 any time an e-mail message includes the keyword "travel."

In one embodiment, the electronic links are provided in a pre-determined priority order. An identified keyword of "hotel" is used. For example, a first hotel room booking web-site pays a largest fee to have its electronic link provided first for every database query for a pre-determined time period. Second and subsequent hotel room booking web-sites pay smaller fees to have their electronic links provided after the first hotel room booking web-site.

Table 7 illustrates electronic links provided in a pre-determined priority order (e.g., Orbitz, Travelocity, Expedia).

TABLE 7

Steve,
    Maybe we could go Delta but I am not sure. We definitely will need a hotel.
Blake Sponsored Listings:
Hotel
Search by Geopgraphy and Hotel Find it at Orbitz Now!
www.Orbitz.com TABLE 7-continued

Up to 70% off Hotels.
Find Last Minute Room Deals. Travelocity Can Save you Money.
www.travelocity.com
Find the Hotel You Want
Hot Deals at Over 9,000 Hotels Search Expedia & Save!
www.expedia.com In another embodiment, Table 7 may illustrates multiple results obtained directly from a search engine or database query.

In another embodiment, a first hotel room booking web-site's electronic link may be added to every instance of the identified keyword "hotel." In another embodiment, the first hotel room booking web-site's electronic link may be added to a first instance of the identified keyword hotel, a second hotel room booking web-site may be added to a second occurrence of the identified keyword hotel, etc. In another embodiment, the first hotel room booking web-site may pay a pre-determined number of identified keyword occurrences (e.g., the first five occurrences in every e-mail, the first occurrence in every other e-mail, etc.).

In another embodiment, the electronic links are provided in a random order. In another embodiment, the electronic links are provided in a pre-determined order (e.g., a round-robin order, a pre-determined pattern repeating order, etc.).

In another embodiment, at Step 46, the database queries may also further include one or more queries to one or more search engines 22, 24. In such an embodiment, the database query results may include a combination of electronic links from both the database 20' and the search engine 22, 24 query results. In such an embodiment, the search engine queries may be used to update out of date or broken electronic link stored in the database 20'.

In another embodiment, an identified keyword may be mapped into plural related keywords (e.g., car rental→Hertz, Avis, Alamo, Dollar, etc.). Plural identified keywords may be mapped into one keyword (e.g., Hertz, Avis, Alamo, etc.→car rental).

However, all of these embodiments are exemplary only and other embodiments and other priority and non-priority methods can also be used to practice the invention.

At Step 48, a database query result is returned from the database 20' including one or more electronic links. The database query result may also include query results from one or more search engines as was described above. At Step 48, the database query result may also include a mapping from a first identified keyword to plural other related keywords. For example, the identified keyword "travel," may be mapped to plural other keywords "hotel rooms, rental cars and airline tickets, etc."

At Step 50, the one or more electronic links are added to the e-mail message creating a modified e-mail message, thereby allowing additional electronic information to be accessed from the modified e-mail message based on information content in the e-mail message (i.e., the original e-mail message). A user can then select (e.g., click on the electronic link) and be provided with additional information associated with the keywords.

In another embodiment, at Step 50 query results are integrated into an e-mail message as a "search electronic link" (i.e., an electronic link that triggers a new search) that is viewed by a user to allow the user to be able to do searches right from the e-mail by selecting an electronic link with the search terms embedded in the electronic link.

Table 8 illustrates such an embodiment. For example, the search electronic link "Hotels" includes query results for hotels, (e.g., Orbitz, Travelocity, Expedia, etc.). The search electronic link "Airlines" includes query results for airlines (e.g., Delta, United, etc.).

TABLE 8

Steve,
  Maybe we could go Delta but I am not sure. We definitely will need
  a hotel.
Blake
<u>Hotels</u> |<u>Airlines</u> |<u>Rental Cars</u> |<u>Restaurants</u>

In one embodiment the electronic link for "Hotels" may include a static search engine query (e.g., http://www.google-.com/search?biw=968&hl=en&q=hotels). Such an electronic link will provide a search engine query (e.g., on Google) when the electronic link is selected in the electronic information message.

FIG. 4 is a flow diagram illustrating a Method 52 for automated electronic information message processing. At Step 54, an electronic information message is received on a network device via a communications network from a source device. At Step 56, the electronic information message is parsed and all electronic information messages related to the electronic information message are parsed to identify one or more keywords in the electronic information message and any related electronic information messages. (e.g., the electronic information message can be parsed anywhere in a communications path anywhere on any device the electronic information message passes through on the communications network). At Step 58, the identified one or more keywords are submitted from the network device to one or more search engines as one or more search engine queries via the communications network. At Step 60, query results are received from the one or more search engines. At Step 62, one or more electronic links are selected from the one or more query results. At Step 64, the one or more selected electronic links are added to the electronic message creating a modified electronic information message, thereby allowing additional electronic information to be accessed from the modified electronic information message based on information content of the electronic information message.

The methods and systems described herein can also be used as another innovative way of driving traffic to contracted, bided, sponsored or free listing services, search engines or web-sites.

Figure 5A:
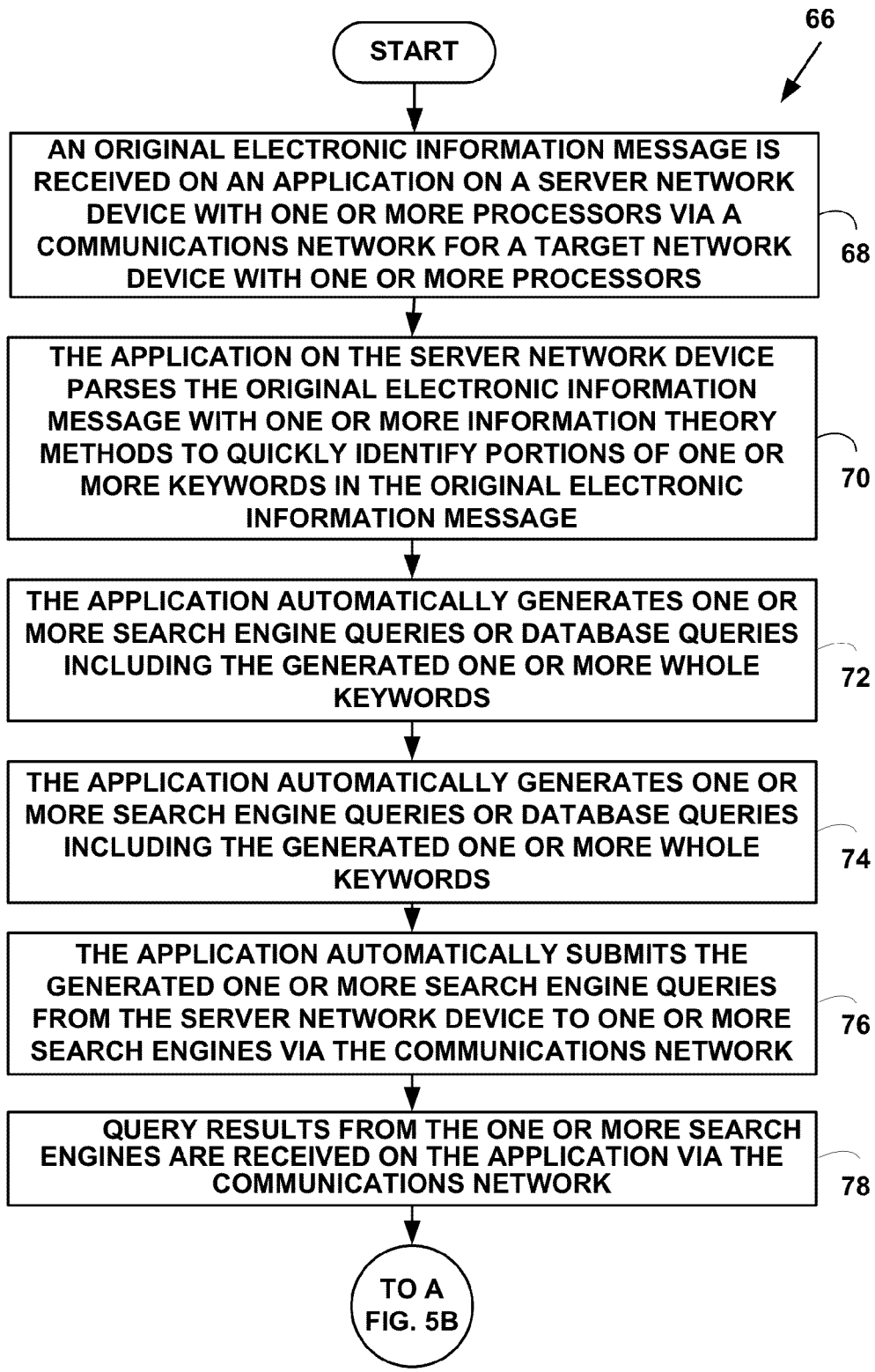

Automatic Electronic Information Message Processing with Hierarchical Information Links FIGS. 5A and 5B are a flow diagram illustrating a Method 66 for automatic electronic information message processing. In FIG. 5A at Step 68, an original electronic information message is received on an application on a server network device with one or more processors via a communications network for a target network device with one or more processors. At Step 70 the application on the server network device parses the original electronic information message with one or more information theory methods to quickly identify portions of one or more keywords in the original electronic information message. At Step 72, the application automatically generates one or more whole keywords from the identified portions of the one or more keywords. At Step 74, the application automatically generates one or more search engine queries or database queries including the generated one or more whole keywords. At Step 76, the application automatically submits the generated one or more search engine queries from the server network device to one or more search engines via the communications network. At Step 78, query results from the one or more search engines are received on the application via the communications network. In FIG. 5B at Step 80, the application selects one or more electronic links from the one or more query results. At Step 82, the application automatically collects additional electronic information via the communications network by sending a selection input to the selected one or more electronic links. At Step 84, the application adds hierarchical electronic links to the generated one or more whole keywords in original electronic message thereby creating a modified electronic information message. The hierarchical electronic links allow the additional collected electronic information to be accessed from the modified electronic information message via a pre-determined hierarchy based on information content of the original electronic information message. The hierarchical electronic links include plural electronic links in a pre-determined order. Each of the plural hierarchical links may in turn include their own set of plural hierarchical links the same or a different pre-determined order. At Step 86, the application sends the modified electronic message from the server network device to the target network device via the communications network.

Method 66 is illustrated with an exemplary embodiment. However, the present invention is not limited to such an exemplary embodiment and other embodiment can be used to practice the invention.

In such an exemplary embodiment At Step 68 an original electronic information message is received on an application 25 on a server network device 20 with one or more processors via a communications network 18 for a target network device 12, 14, 16 with one or more processors.

In one embodiment, a copy of the original (i.e., unaltered) electronic information message is stored in a database 20' associated with the server network device 20.

In one embodiment, the application 25 is a software application. In another embodiment, the application 25 is a hardware application. In another embodiment, the application 25 is a firmware application. In another embodiment, the application 25 is combination thereof or hardware, software and/or firmware.

In another embodiment, the application 25 is included only on the target network devices 12, 16, 18 instead of on the sever network device 20. In such an embodiment, the application 25 includes an application for a smart phone such as the iPhone by Apple, Inc., the Blackberry, by Research In Motion (RIM), other such smart phone devices and other non-smart mobile and non-mobile network devices.

In one embodiment, the server network device 20 is an electronic mail (e-mail), instant message (IM), Short Message Service (SMS), Multimedia Messaging Service (MMS), social networking (e.g., Facebook™, Utube™, MySpace™, etc.) server network device 20.

As is known in the art, Short Message Service (SMS) is a communication service component of mobile communication systems, using standardized communications protocols that allow the exchange of short text messages between mobile phone devices. SMS allows exchange of electronic text messages of 160 characters in length.

As is known in the art, Multimedia Messaging Service (MMS) is a standard way to send messages that include multimedia content to and from mobile phones. It extends the core SMS capability which only allowed exchange of text messages up to 160 characters in length. The most popular use is to send photographs and video from camera-equipped handsets, although it is also popular as a method of delivering news and entertainment content including videos, pictures, text pages and ringtones.

As is known in the art, a social network service (e.g., Facebook™, Utube™, MySpace™, etc.) focuses on building and reflecting of social networks or social relations among people, e.g., who share interests and/or activities. A social network service essentially consists of a representation of each user (often a profile), his/her social links, and a variety of additional services. Most social network services are web based and provide means for users to interact over the Internet, such as e-mail, IM, SMS, MMS, etc.

As is known in the art, Twitter™ is a social networking and microblogging service that enables its users to send and read messages known as "tweets." Tweets are text-based posts of up to 140 characters displayed on an author's profile page and delivered to the author's subscribers who are known as followers. Senders can restrict delivery to those in their circle of friends or, by default, allow open access. Since late 2009, users can follow lists of authors instead of following individual authors. All users can send and receive tweets via the Twitter website, SMS or external applications (notably including those developed for smart phones).

At Step 70 the application 25 on the server network device 20 parses the original electronic information message with one or more information theory methods to quickly identify portions of one or more keywords in the original electronic information message.

At Step 72, the application 25 automatically generates one or more whole keywords from the identified portions of the one or more keywords with the one or more information theory messages.

As is known in the art, "information theory" includes the quantification of information. A key measure of information theory is "entropy," which is usually expressed by the average number of bits needed for storage or communication. Information theory is generally considered to have been founded in 1948 by Claude Shannon in his seminal work, "A Mathematical Theory of Communication," *Bell System Technical Journal*, vol. 27, pp. 379-423, 623-656, July, October, 1948, the contents of which is incorporated by reference. The central paradigm of classical information theory is the engineering problem of the transmission of information over a noisy channel.

The most fundamental results of this theory are Shannon's source coding theorem, which establishes that, on average, the number of bits needed to represent the result of an uncertain event is given by its entropy; and Shannon's noisy-channel coding theorem, which states that reliable communication is possible over noisy channels provided that the rate of communication is below a certain threshold called the "channel capacity." The channel capacity can be approached in practice by using appropriate encoding and decoding systems.

Information theory encoding and decoding system include lossless data compression, lossy data compression, and communication channel coding.

The main concepts of information theory can be grasped by considering the most widespread means of human communication: language. Two important aspects of a concise language are as follows: First, the most common words should be shorter than less common words so that sentences will not be too long. Such a tradeoff in word length is "data compression" and is the essential aspect of "source message encoding."

In information theory information entropy is the same as randomness. A string of random English letters is said to have high information entropy, in other words large amounts of entropy. However, the complete works of Edgar Allan Poe, by contrast, have lower information entropy, because when forming meaningful words certain combinations of letters are more likely to occur than others.

In one embodiment, one method of information theory used is what Claude E. Shannon described as "Communication Without Noise." Shannon noted that the English language seems to be about 50% meaningless syntax, letters and phrasing.

In such an embodiment, as the original electronic messages are received, the message are translated into binary and a stochastic process is used that is essentially equivalent to the electronic messages received. The "stochastic process" is a process that creates an "average message" in terms of probabilities of various patterns of English letters occurring. At that point an information entropy is calculated and a matching code is used to identify portions of keywords and generate a whole keyword from identified portions of the keywords.

Shannon defined a measure of information content called the self-information or surprisal of a received message m as is illustrated by Equation (1):

$$I(m) = -\log_p(m), \quad (1)$$

where $p(m) = P_r(M=m)$ is the probability that message m is chosen from all possible choices in the message space M. Equation (1) causes messages with lower probabilities to contribute more to the overall value of information I(m). In other words, infrequently occurring messages are more valuable.

For example in English if a letter "q" appears in a word you can be almost certain it is followed by a letter "u" (e.g., quack, quad, quadrant, etc.) because virtually all words in English that start with the letter "q" have a second letter including the letter "u." This provides very little self-information and such words are more difficult to derive with only a portion of a keyword. However, if the letter "q" in a word, followed by a letter "i" for the word "qintar" provides a large amount of information because virtually no words in the English language in the two letters "qi." This provides lots of self-information and such words are less difficult to derive with only a portion of a keyword.

The stochastic process is also valid for short-hand syntax used in IM, SMS, MMS, etc. For example, a user of a target network device 12, 14, 16, may encode the message "talk to you at 7 o'clock" as "tk 2 u @ 7" and so on. The stochastic process used herein probably handles such translations from portions of short-hand syntax to whole English words.

Using information theory to create a whole keyword only from a portion of a keywords creates whole keywords quicker and with less processing power than would be required from parsing whole keywords. In one embodiment, a specially constructed information theory database 20' is used to create whole keywords from portions of keywords. In such an embodiment, the database 20' includes entries for short-hand and slang syntax commonly used for IM, SMS, etc.

However, the present invention is not limited to the information theory methods described and other information theory methods can also be used to practice the invention.

In one embodiment, the one or more identified keywords may be used directly for the search engine queries (e.g., hotel). In another embodiment, the one or more identified keywords may be mapped to one or more other sets of related keywords that are used to make the search engine queries (e.g., travel hotel, airplane ticket, rental car, etc.). In another embodiment, two or more identified keywords may be mapped back to a single keyword (e.g., hotel, airplane ticket, car rental travel, etc.).

At Step 74, the application 25 automatically generates one or more search engine queries or database queries including the generated one or more whole keywords. In one embodiment, the server network device 20 includes one or more associated databases 20' that include additional information in a pre-determined information hierarchy.

At Step 76, the application 25 automatically submits the generated one or more search engine queries from the server network device 20 to one or more search engines via the communications network 18.

For example, the generated one or more search engine queries may be submitted to public search engines such as Google™, Bing™, Lycos™, Yahoo™, Galaxy™, etc. on the Internet. The generated one or more search engine queries may also be submitted to one or more private search engines on an intranet or other private or public networks. The generated one or more search engine queries may also be submitted to one or more private search engines cached directly in memory on the server network device 20 that are used without accessing communications network 18.

At Step 78, query results from the one or more search engines are received on the application 25 via the communications network 18.

In FIG. 5B at Step 80, the application 25 selects one or more electronic links from the one or more query results. In one embodiment, the application 25 selects the one or more electronic links using a pre-determined information hierarchy.

In one embodiment, the pre-determined information hierarchy includes emergency information, time-specific information, paid advertising information, general advertising information, general information, public interest information and/or public service information. However, the present invention is not limited to such a pre-determined information hierarchy, and other types of information hierarchies with more, fewer or other information categories can be used to practice the invention.

In one embodiment, the emergency information includes, weather, governmental (e.g., terrorist, military, etc.), police and fire and other types of emergency information. In one embodiment, the time-specific information includes traffic information, street closure information, etc.

In one embodiment, the paid advertising information includes information for which advertiser have paid a fee to allow their advertising information including electronic links to be provided and inserted into the electronic message that flow through the server network device.

At Step 82, the application 25 automatically collects additional electronic information via the communications network 18 by sending a selection input to the selected one or more electronic links. For example, the selection input includes an additional search engine query based on a pre-determined selection criteria. In one embodiment, the pre-determined selection criteria include the pre-determined information hierarchy.

At Step 84, the application 25 adds hierarchical electronic links to the generated one or more whole keywords in original electronic message thereby creating a modified electronic information message. The hierarchical electronic links allow the additional collected electronic information to be accessed from the modified electronic information message via a pre-determined hierarchy based on information content of the original electronic information message. The hierarchical electronic links include plural electronic links in a pre-determined order.

For example, in one embodiment, the pre-determined order includes links for emergency information, time-specific information, paid advertising information, general advertising information, general information, public interest information and/or public service information.

In one embodiment, the hierarchical electronic links include a plural electronic links including a chain of electronic links in a pre-determined order. In such an embodiment, the pre-determined order includes the pre-determined order listed above. The chain of electronic links allows a user to select (e.g., click through, etc.) the electronic links in the pre-determined order. In one embodiment the chain is a circular chain that allows a user to click through all the electronic links from a first link to a last link. The last electronic link is linked back to the first electronic link. The user can start on any link in any order and loop through all the electronic links.

In one embodiment, the hierarchical electronic links include a plural electronic links including a chain of electronic links in a pre-determined order wherein the hierarchical electronic links are added based on a physical geographic location of the target network device 12, 14, 16. In such an embodiment, the physical geographic location includes a physical geographic location determined by GPS coordinates, Wi-Fi hotspot coordinates, mobile telephone (analog or digital signal) tower triangulation coordinates, etc. In one embodiment, Wi-Fi hotspots are determined using an IP address and a hardware address (e.g., Medium Access Control (MAC) address, etc.) of a network device that is being used to identify the network device on a Wi-Fi network. However, the present invention is not limited to this embodiment and other embodiments can also be used for Wi-Fi hotspots.

In one embodiment, Step 84 includes modifying a font color, a font size, a font bolding, a font underlining, or a font italicizing of a font for enhancing display of an identified keyword in the original electronic information message. For example, an emergency information link may be changed to a red blinking font, a time-specific information link may be changed to a green blinking, italic font, etc.

In another embodiment, Step 84 includes adding dynamic hierarchical electronic links. In such an embodiment, the dynamic hierarchical electronic links are linked to the server network device 20, which dynamically and automatically adjusts, adds and removes electronic links in the modified electronic message. For example, the hierarchical links may be dynamically adjusted when an advertiser pays to be at a top of an advertising list, an emergency situation is no longer an emergency, a time-sensitive situation is no longer time sensitive.

In such an embodiment, the first time a user selects a specific dynamic hierarchical electronic link they may be directed to a web-site for advertiser-A. The very next time the user selects the same specific dynamic hierarchical electronic link they may be directed to a web-site for advertiser-B, etc. In such an embodiment, even though a different advertising information, etc. may appear by clicking the specific dynamic hierarchical electronic link, the user is still directed through the hierarchy in the pre-determined order.

In such an embodiment, the dynamic hierarchical electronic links may be also removed from the modified electronic information messages, changed a different font or color, or otherwise modified to indicate that they are not longer relevant.

At Step 86, the application 25 sends the modified electronic message from the server network device 20 to the target network device 12, 14 16 via the communications network 18.

Figure 6:
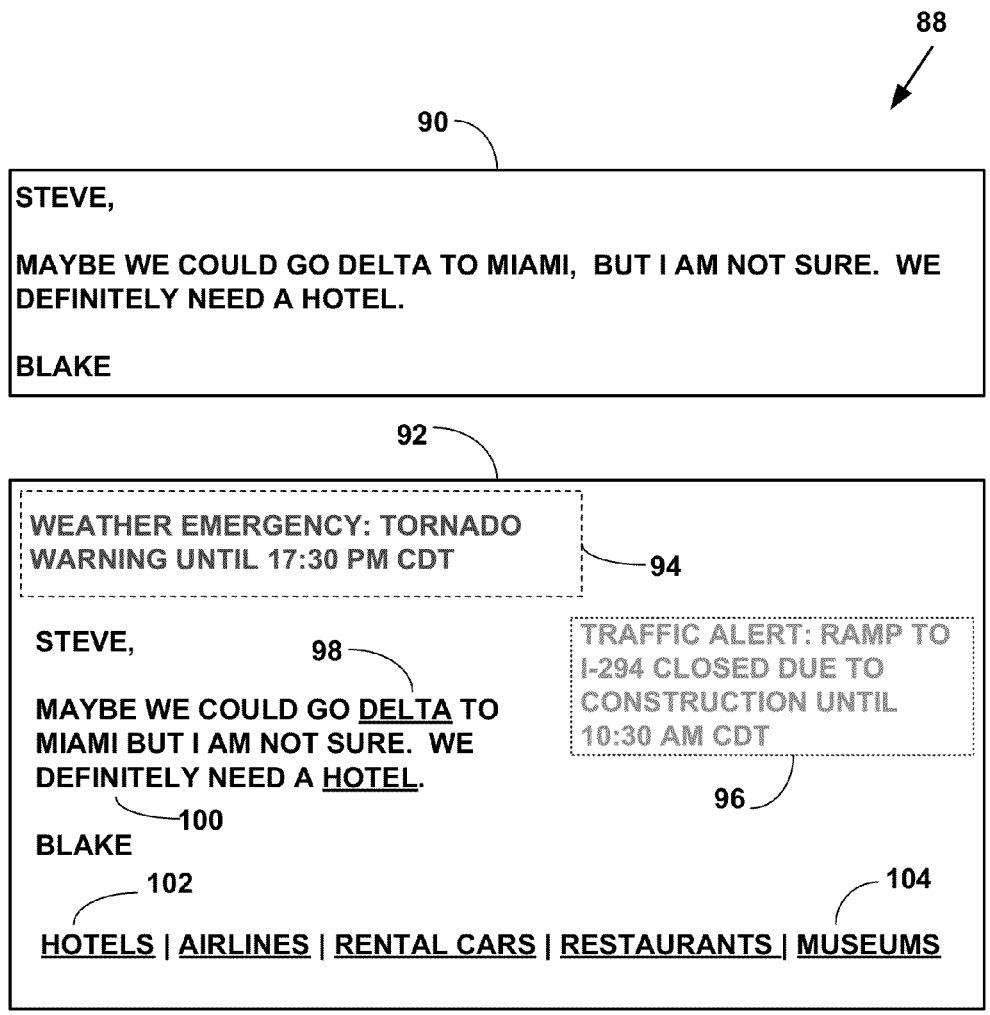
FIG. 6 is a block diagram illustrating an exemplary electronic information messages.

FIG. 6 is a block diagram 88 illustrating an exemplary electronic information messages 90, 92. Item 90 includes an original electronic information message received at Step 68 of Method 66.

Item 92 includes a modified electronic information message created by Method 66. The modified electronic information message includes additional electronic links 94, 96, 98, 100, 102 and 104. Electronic link 94 includes an emergency information link (e.g., emergency weather information, etc.). Electronic link 96 includes time-specific information (e.g., a free ramp closure, etc.). Both electronic links 94 and 96 would be added based on a physical geographic location of the target network device 12, 14, 16.

Electronic links 98 and 100 include paid advertising links in which the keywords "Delta" for Delta airlines and "hotel" has been replaced to paid advertiser web-sites that offer the purchase of airline tickets including Delta and book hotels, etc. Electronic link 102 includes electronic links to both paid and un-paid advertising web-sites. Electronic link 104 includes an electronic link to public interest information for local museums, etc.

In one embodiment, Method 66 adds additional electronic links for all levels in the pre-determined information hierarchy. In another embodiment, Method 66 adds additional electronic links for less than all levels in the pre-determined information hierarchy. For example, if there were no pertinent emergency information available, not emergency information links would be added, etc.

FIG. 6 illustrates top level links 108 in the pre-determined information hierarchy and one (top-1) level link 109. Each individual electronic link can include its own pre-determined information hierarchy which may or may not be the same as the pre-determined information hierarchy used for other electronic links.

Figure 7:
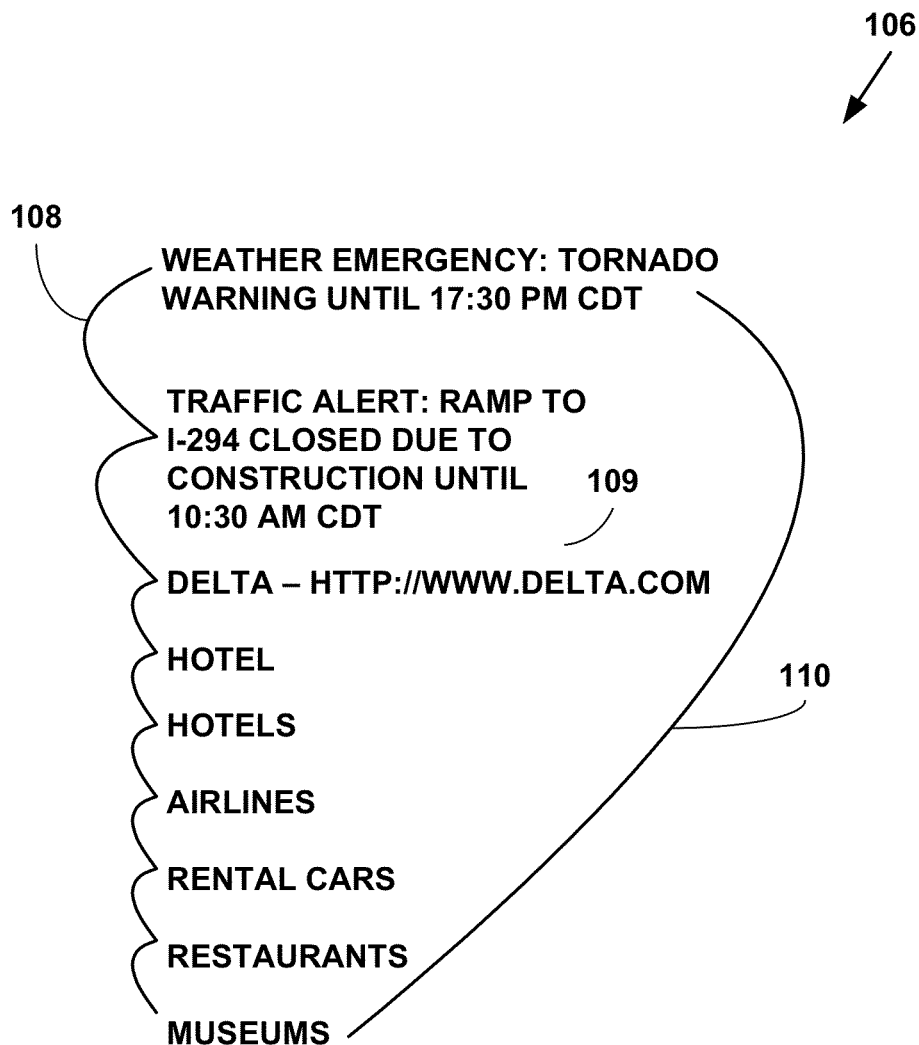
FIG. 7 is block diagram illustrating an exemplary electronic information message hierarchy for the exemplary electronic information messages in FIG. 6.

FIG. 7 is block diagram 106 illustrating an exemplary electronic information message hierarchy for the exemplary electronic information messages in FIG. 6. In FIG. 7, the electronic links are linked 108 and chained together with circular electronic links 110 so the last electronic link is linked back to the first electronic link.

FIGS. 8A and 8B are a flow diagram illustrating a Method 112 for automatic electronic information message processing.

In FIG. 8A at Step 114, an original electronic information message (e.g., 90 FIG. 6) is received on an application 25 on a target network device 12, 14, 16 with one or more processors via a communications network 18 from a server network device 20 with one or more processors. At Step 116, the application 25 on the target network device 12, 14, 16 parses the original electronic information message with one or more information theory methods to quickly identify portions of one or more keywords in the original electronic information message 90. At Step 118, the application 25 automatically generates one or more whole keywords from the identified portions of the one or more keywords (e.g., Delta, hotel, Miami, etc.) At Step 120, the application 25 automatically generates one or more search engine queries or database 20' queries including the generated one or more whole keywords. At Step 122, the application automatically submits the generated one or more search engine queries from the server network device to one or more search engines via the communications network. At Step 124, query results from the one or more search engines are received on the application 25 via the communications network 18. In FIG. 8B at Step 124, the application 25 selects one or more electronic links from the one or more query results. At Step 126, the application 25 automatically collects additional electronic information via the communications network by sending a selection input to the selected one or more electronic links. At Step 128, the application 25 adds hierarchical electronic links 94, 96, 98, 100, 102, 104 to the generated one or more whole keywords in original electronic message 90 thereby creating a modified electronic information message 92. The hierarchical electronic links allow the additional collected electronic information to be accessed from the modified electronic information message 92 via a pre-determined hierarchy based on information content of the original electronic information message 90. The hierarchical electronic links include plural electronic links in a pre-determined order. At Step 130, the application 25 displays the modified electronic message 92 on the target network device 12, 14, 14.

The steps of Method 114 for application 25 the target network device 12, 14, 16 are similar to those for application 25 on the server network device 20.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for automatically processing electronic information messages, comprising:

receiving an original electronic information message on an application on a server network device with one or more processors via a communications network for a target network device with one or more processors;

quantifying the original electronic information with one or more information theory methods by measuring an entropy of the original electronic information;

parsing on the application on the server network device using the quantified original electronic information message with the one or more information theory methods to identify portions of one or more keywords in the original electronic information message;

generating automatically via the application one or more whole keywords from the identified portions of the one or more keywords using the one or more information theory methods, wherein generating a whole keyword only from a portion of a keyword creates whole keywords quicker and with less processing power than would be required from parsing whole keywords;

generating automatically via the application one or more search engine queries including the generated one or more whole keywords;

submitting automatically via the application the generated one or more search engine queries from the server network device to one or more search engines via the communications network;

receiving query results from the one or more search engines on the application via the communications network;

selecting on the application one or more electronic links from the one or more query results;

collecting automatically on the application additional electronic information via the communications network by sending a selection input to the selected one or more electronic links;

adding on the application dynamic hierarchical electronic links in a pre-determined hierarchy linking the automatically collected additional electronic information to the generated one or more whole keywords in the original electronic message, thereby creating a modified electronic information message;

including the dynamic hierarchical links in the pre-determined hierarchy in a pre-determined order including from a first order position to a last order position including: emergency information, time-specific information, paid advertising information, general advertising information, general information, public interest information and public service information for the generated one or more whole keywords, wherein an individual dynamic hierarchical link is added or not added to an order position based on availability of electronic information for the order position, wherein the dynamic hierarchical electronic links are linked through the application on the server network device and are dynamically and automatically adjusted by removing original electronic links to original automatically collected additional electronic information and adding to new electronic links to different automatically collected additional electronic information for the modified electronic message based on a change in one or more pre-determined situations;

providing access of the dynamic hierarchical electronic links with the additional collected electronic information from the modified electronic information message via the pre-determined hierarchy based on information content of the original electronic information message, wherein the dynamic hierarchical electronic links include the plurality of electronic links in the pre-determined order and wherein an individual dynamic hierarchical electronic link includes another plurality of electronic links in another pre-determined order;

sending the modified electronic message from the application on the server network device to the target network device via the communications network;

dynamically and automatically adjusting the dynamic hierarchical electronic links in the modified electronic message on the target network device from the application on the server network device via the communications network whenever one or more of the pre-determined situations affecting the dynamic hierarchical links change, the adjusting including adding new different electronic links for new different automatically collected additional electronic information to the dynamic hierarchical electronic links and modifying one or more of a plurality of font characteristics of a font used to display to the generated one or more whole keywords in the modified electronic message on the target network device.

2. One or more processors on one or more network devices including a non-transitory computer readable medium having stored therein a plurality of instructions for causing the one or more processors to execute the steps of:

receiving an original electronic information message on an application on a server network device with one or more processors via a communications network for a target network device with one or more processors;

quantifying the original electronic information with one or more information theory methods by measuring an entropy of the original electronic information;

parsing on the application on the server network device using the quantified original electronic information message with the one or more information theory methods to identify portions of one or more keywords in the original electronic information message;

generating automatically via the application one or more whole keywords from the identified portions of the one or more keywords using the one or more information theory methods, wherein generating a whole keyword only from a portion of a keyword creates whole keywords quicker and with less processing power than would be required from parsing whole keywords;

generating automatically via the application one or more search engine queries including the generated one or more whole keywords;

submitting automatically via the application the generated one or more search engine queries from the server network device to one or more search engines via the communications network;

receiving query results from the one or more search engines on the application via the communications network;

selecting on the application one or more electronic links from the one or more query results;

collecting automatically on the application additional electronic information via the communications network by sending a selection input to the selected one or more electronic links;

adding on the application dynamic hierarchical electronic links in a pre-determined hierarchy linking the automatically collected additional electronic information to the generated one or more whole keywords in the original electronic message, thereby creating a modified electronic information message;

including the dynamic hierarchical links in the pre-determined hierarchy in a pre-determined order including from a first order position to a last order position including: emergency information, time-specific information, paid advertising information, general advertising information, general information, public interest information and public service information for the generated one or more whole keywords, wherein an individual dynamic hierarchical link is added or not added to an order position based on availability of electronic information for the order position, wherein the dynamic hierarchical electronic links are linked through the application on the server network device and are dynamically and automatically adjusted by removing original electronic links to original automatically collected additional electronic information and adding to new electronic links to different automatically collected additional electronic information for the modified electronic message based on a change in one or more pre-determined situations;

providing access of the dynamic hierarchical electronic links with the additional collected electronic information from the modified electronic information message via the pre-determined hierarchy based on information content of the original electronic information message, wherein the dynamic hierarchical electronic links include the plurality of electronic links in the pre-determined order and wherein an individual dynamic hierarchical electronic link includes another plurality of electronic links in another pre-determined order;

sending the modified electronic message from the application on the server network device to the target network device via the communications network;

dynamically and automatically adjusting the dynamic hierarchical electronic links in the modified electronic message on the target network device from the application on the server network device via the communications network whenever one or more of the pre-determined situations affecting the dynamic hierarchical links change, the adjusting including adding new different electronic links for new different automatically collected additional electronic information to the dynamic hierarchical electronic links and modifying one or more of a plurality of font characteristics of a font used to display to the generated one or more whole keywords in the modified electronic message on the target network device.

3. The method of claim 1 wherein the electronic message is an electronic mail (e-mail) message, an instant message (IM), a Short Message Service (SMS) message, a Multimedia Messaging Service (MMS) message, a social networking message or a tweet message.

4. The method of claim 1 wherein the adding step includes modifying a font color, a font size, a font bolding, a font underlining, or a font italicizing of a font for enhancing display of an identified keyword in the original electronic information message.

5. The method of claim 1 wherein the parsing step includes parsing a current electronic information message and one or more other related electronic information messages in a chain of related electronic information messages.

6. The method of claim 1 wherein the submitting step includes mapping a single identified whole keyword into a plurality of related keywords, or mapping a plurality of identified whole keywords into a single keyword before submitting the one or more queries to the one or more search engines.

7. The method of claim 1 wherein the pre-determined hierarchy includes an information hierarchy of advertising information, non-advertising information, public interest information and health and safety information.

8. The method of claim 7 wherein the advertising information includes advertising information for which a fee is paid and free advertising information.

9. The method of claim 1 wherein the dynamic hierarchical electronic links include a plurality of dynamic electronic links including a chain of electronic links in a pre-determined order including emergency information, time-specific information, paid advertising information, general advertising information, general information, public interest information and public service information.

10. The method of claim 1 wherein the dynamic hierarchical electronic links include a plurality of electronic links including a chain of electronic links in a pre-determined order wherein the dynamic hierarchical electronic links are added based on a physical geographic location of the target network device.

11. The method of claim 10 wherein physical geographic location of the target network device is determined by Global Positioning System (GPS) coordinates, Wireless Fidelity (Wi-Fi) hotspot coordinates or analog or digital cellular tower telephone coordinates.

12. The method of claim 9 wherein the chain of links includes a circular chain of links.

13. The method of claim 1 further comprising:
storing a copy of the original electronic information message in a database associated with the server network device.

14. The method of claim 1 further comprising:
displaying the modified electronic message on a second application on the target network device;
receiving on the second application on the target network device dynamic and automatic adjustment of the dynamic hierarchical electronic links in the modified electronic message displayed on the second application on the target network device from the application on the server network device whenever one or more of the pre-determined situations affecting the dynamic hierarchical links change, the adjusting including adding new different electronic links to the dynamic hierarchical electronic links and modifying one or more of a plurality of font characteristics of a font used to display to the generated one or more whole keywords in the modified electronic message;
receiving a first selection input on the application on the server network device from the second application on the target network device via the communications network for a selected dynamic hierarchal electronic link;
directing the second application on the target network device to first automatically collected electronic information associated with the selected dynamic hierarchical electronic link from the application on the server network device;
automatically and dynamically adjusting the selected dynamic hierarchical electronic link on the second application on the target network device from the server application on the server network device via the communications network to link to second automatically collected electronic information based on a change in a pre-determined situation associated with the selected dynamic hierarchical electronic link displayed in the modified electronic message;
receiving a second selection input on the application on the server network device from the second application on the target network device via the communications network for the selected dynamic hierarchal electronic link; and
directing the second application on target network device to the second automatically collected electronic information now associated with the selected dynamic hierarchical electronic link from the application on the server network device via the communications network.

15. The method of claim 14 further comprising:
automatically modifying from the application on the server network device via the communications network any dynamic hierarchical electronic link in the modified electronic message displayed by the second application on the target network device by changing the dynamic hierarchical electronic link to a different font or a different color when associated automatically collected electronic information is longer relevant.

16. The method of claim 14 wherein the electronic message is an electronic mail (e-mail) message, an instant message (IM), a Short Message Service (SMS) message, a Multimedia Messaging Service (MMS) message, a social networking message or a tweet message.

17. The method of claim 14 wherein the application is an application for a smart phone.

18. The method of claim 14 wherein the dynamic hierarchical electronic links include a plurality of electronic links including a chain of electronic links in a pre-determined order including emergency information, time-specific information, paid advertising information, general advertising information, general information, public interest information and public service information.

19. The method of claim 14 wherein the dynamic hierarchical electronic links include a plurality of electronic links including a chain of electronic links in a pre-determined order wherein the hierarchical electronic links are added based on a physical geographic location of the target network device, wherein physical geographic location of the target network device is determined by Global Positioning System (GPS) coordinates, Wireless Fidelity (Wi-Fi) hotspot coordinates or analog or digital cellular tower telephone coordinates.

20. A system for automatically processing electronic information messages, comprising in combination:
means for receiving an original electronic information message on an application on a server network device with one or more processors via a communications network for a target network device with one or more processors;
means for receiving the original electronic information message on an application on the target network device with one or more processors via a communications network from a server network device with one or more processors;
means for quantifying the original electronic information with one or more information theory methods by measuring an entropy of the original electronic information;
means for parsing on the application the quantified original electronic information message with the one or more information theory methods to quickly identify portions of one or more keywords in the original electronic information message;
means for generating automatically via the application one or more whole keywords from the identified portions of the one or more keywords using the one or more information theory methods, wherein generating a whole keyword only from a portion of a keyword creates whole keywords quicker and with less processing power than would be required from parsing whole keywords;
means for generating automatically via the application one or more search engine queries including the generated one or more whole keywords;
means for submitting automatically via the application the generated one or more search engine queries from the server network device to one or more search engines via the communications network;
means for receiving query results from the one or more search engines on the application via the communications network;
means for selecting on the application one or more electronic links from the one or more query results;
means for collecting automatically additional electronic information via the communications network by sending a selection input to the selected one or more electronic links;
means for adding dynamic hierarchical electronic links in a pre-determined hierarchy linking the automatically collected additional electronic information to the generated one or more whole keywords in original electronic message thereby creating a modified electronic information message;

means for including the dynamic hierarchical links in the pre-determined hierarchy in a pre-determined order including from a first order position to a last order position including: emergency information, time-specific information, paid advertising information, general advertising information, general information, public interest information and public service information for the generated one or more whole keywords, wherein an individual dynamic hierarchical link is added or not added to an order position based on availability of electronic information for the order position, wherein the dynamic hierarchical electronic links are linked through the application on the server network device and are dynamically and automatically adjusted by removing original electronic links to original automatically collected additional electronic information and adding to new electronic links to different automatically collected additional electronic information for the modified electronic message based on a change in one or more pre-determined situations;

means for providing access of the dynamic hierarchical electronic links with the additional collected electronic information from the modified electronic information message via the pre-determined hierarchy based on information content of the original electronic information message, wherein the dynamic hierarchical electronic links include a plurality of electronic links in a pre-determined order and wherein an individual dynamic hierarchical electronic link includes another plurality of electronic links in another pre-determined order; and means for sending the modified electronic message from the server network device to the target network device via the communications network;

means for displaying the modified electronic message on the target network device; and means for dynamically and automatically adjusting the dynamic hierarchical electronic links in the modified electronic message on the target network device from the application on the server network device via the communications network whenever one or more of the pre-determined situations affecting the dynamic hierarchical links change, the means for adjusting including adding new different electronic links for new different automatically collected additional electronic information to the dynamic hierarchical electronic links and modifying one or more of a plurality of font characteristics of a font used to display to the generated one or more whole keywords in the modified electronic message.

21. The method of claim 1 wherein the change in one or more pre-determined situations includes a new advertiser that pays to be at a top of an advertising list, an emergency situation is no longer an emergency, a time-sensitive situation is no longer time sensitive or a determined physical geographic location situation is no longer valid.

* * * * *